March 10, 1964  V. F. PIERSON ETAL  3,124,002
TEMPERATURE HUMIDITY INDEX INDICATOR
Filed Oct. 27, 1960
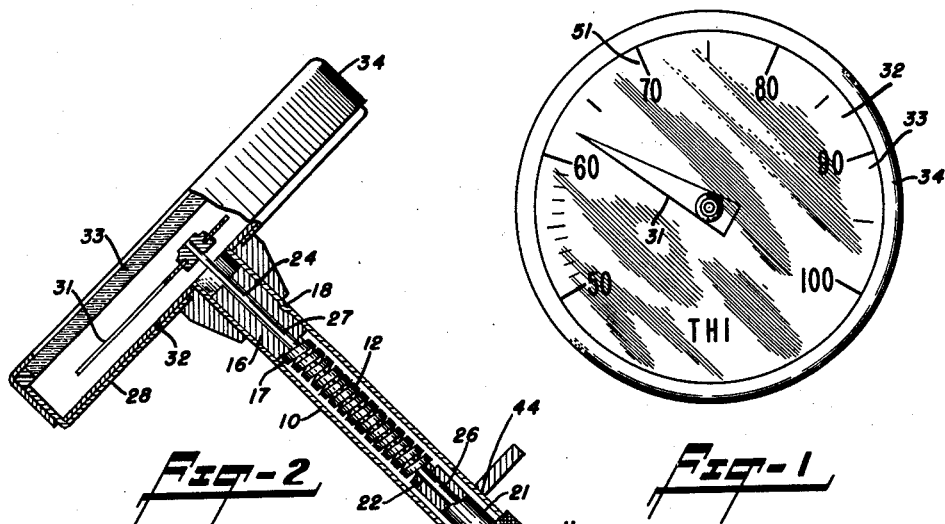
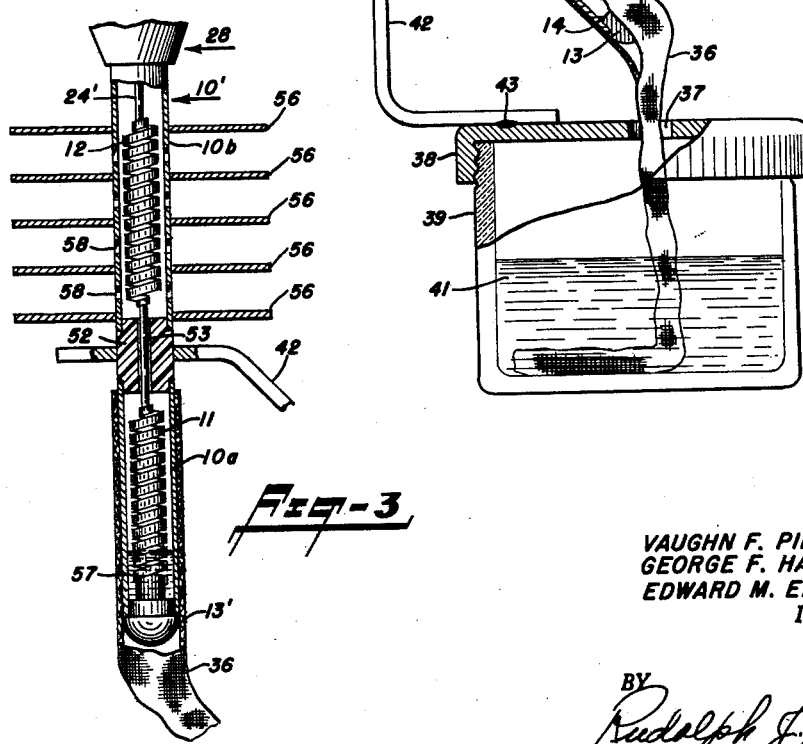
VAUGHN F. PIERSON
GEORGE F. HAGEMAN
EDWARD M. EADIE JR.
INVENTORS
BY Rudolph J. Lurick
ATTORNEY United States Patent Office 3,124,002
Patented Mar. 10, 1964

3,124,002
TEMPERATURE HUMIDITY INDEX INDICATOR
Vaughn F. Pierson, Morristown, and George F. Hageman, Union, N.J., and Edward M. Eadie, Jr., Topsfield, Mass., assignors, by mesne assignments, to Daystrom, Incorporated, Murray Hill, N.J., a corporation of Texas
Filed Oct. 27, 1960, Ser. No. 65,355
7 Claims. (Cl. 73—336)

This invention relates to a temperature humidity index indicator and more particularly to such an indicator in which the temperature humidity index is directly indicated without the necessity of manual adjustment or operation thereof.

In the year 1929, the United States Weather Bureau, in cooperation with the American Society of Heating and Ventilating Engineers, began an investigation of how heat, humidity and air motion affect human comfort, the outgrowth of the investigation providing calculations which gave what was then called the "effective temperature." Recently, in 1959, the United States Weather Bureau in Washington, D.C., began issuing reports on what was then called the "discomfort index" along with its regular temperature and humidity reports. It was intended that the "discomfort index," which was later renamed the "temperature humidity index" (commonly abbreviated THI), would serve as a simple expression of the composite effect of air temperature and relative humidity.

Air temperature, relative humidity and air motion act together to produce the sensation of warmth or cold that is experienced by the human body. The body dissipates heat to the ambient air moving past its surface by ordinary methods of conduction or convection. In this process, air temperature and air motion are the essential factors causing heat transfer. Some moisture is always evaporating from the surface of the skin and when necessary, the sweat glands in the body permit large quantities of water to pass through the surface of the skin. If the air in contact with the body is not saturated, this water is taken up by evaporation into the air thereby producing a cooling effect. This process of body cooling is especially effective when the air humidity is low.

The temperature humidity index (THI) is defined in equation form as:

$$THI = .4(DB+WB) + 15 \qquad (1)$$

wherein DB and WB indicate dry-bulb and wet-bulb temperatures, respectively, in degrees Fahrenheit. A common method currently used to calculate the temperature humidity index involves obtaining the wet-bulb and drybulb temperatures in degrees Fahrenheit from an instrument such as a sling psychrometer, multiplying the sum of the two temperatures by 0.4 and adding 15. (It will be noted that the wet-bulb temperature so obtained is taken in rapidly moving air and the resultant calculated THI is not indicative of human comfort, or discomfort, since the actual air velocity is not taken into account.)

Based upon experiments conducted jointly by the United States Weather Bureau and the American Society of Heating and Ventilating Engineers, the following is an indication of how comfortable the average person will be at various THI readings:

About 10% of the population will be uncomfortable when the THI reaches 70; one-half or more of the people will be uncomfortable with a THI of 75; and at a THI of 79 substantially every person will be uncomfortable.

With the apparatus of our invention, the temperature humidity index is read directly on a suitably calibrated scale. There is no necessity to perform mathematical operations in order to compute the THI, and no manual adjustments or settings are required. In simplest terms, the device of our invention comprises wet-bulb and drybulb helical wound bimetallic elements connected together in series arrangement and with a pointer attached to one end thereof for cooperation with a calibrated scale. That portion of the stem within which the wet-bulb element is located is fitted with a moist wick, the one free end of which is preferably positioned in water to maintain the wick moist. With a properly calibrated scale, the pointer indicates the temperature humidity index.

The device may include means thermally isolating the wet and dry bulb elements for accuracy of indication. Further, heat transfer fins may be included adjacent the dry bulb element for maintaining the same as close to the ambient temperature as possible.

An object of this invention is a direct reading temperature humidity index indicator which requires no manipulating or calculation.

An object of this invention is the provision of a THI indicator which is economically manufactured, yet rugged and durable.

An object of this invention is the provision of a THI indicator including wet and dry bulb bimetallic elements connected in series and to a pointer movable over a calibrated dial, and a wettable wick adjacent the wet-bulb element.

These and other objects and advantages will become apparent from the following description when taken with the accompanying drawings. It will be understood that the drawings are for purposes of illustration and are not to be construed as defining the scope or limits of the invention, reference being had for the latter purpose to the appended claims.

In the drawings wherein like reference characters denote like parts in the several views:

FIGURE 1 is a fragmentary front view of a temperature humidity index indicator incorporating this invention;

FIGURE 2 is a side elevational view of the device shown in FIGURE 1 with parts shown broken away from clarity; and FIGURE 3 is a fragmentary side elevational view of a modified device incorporating this invention.

Reference is first made to FIGURES 1 and 2 of the drawings wherein the indicator is shown comprising a tubular stem 10 within which wet and dry-bulb helical bimetallic coils 11 and 12 are mounted; the said bimetallic coils, or elements 11 and 12 being preferably of identical construction but provided with different reference characters for purposes of identification. The lower end of the tubular stem may be closed by a plug 13 as by soldering, brazing, or other suitable means, designated 14.

The upper end of the dry-bulb coil 12 is secured to a bushing 16 as by soldering, or welding, designated 17, said bushing being secured to the stem 10 by an indentation 18 of the stem into the side of the bushing. The lower end of the coil 12 is secured to an elongated and generally cylindrical-shaped connector 21 as by spot welding 22, for example, for connection to the wet-bulb coil secured to the lower end of the connector as by spot welding 23. The lower end of a staff 24 is fastened to the lower end of the wet-bulb element 11 by welding, or other suitable means; the said staff extending upwardly through the wet-bulb element 11, a clearance hole 26 formed in the connector 21, the dry-bulb element 12, a clearance hole 27 formed in the bushing 16 and into a casing 28 secured to the tubular stem 10.

An indicating pointer 31 is secured to the end of the staff within the casing 28. A scale plate 32 is secured to the casing 28 and carries scale markings graduated in temperature humidity index units between 50 and 100. A greater scale range is deemed unnecessary since almost everyone is comfortable with a THI of less than 70 while almost everyone is uncomfortable with a THI of 79 and above. A cover glass 33 is secured to the front of the casing by a ring 34.

In accordance with this invention, an absorbent fabric wick 36 is fitted onto the tubular stem 10 and extends over the wet-bulb element 11; the wick terminating at a point on the stem substantially over the connector 21. The wick passes through an opening 37 formed in the screw cover 38 of a jar 39 containing water 41, within which water the wick extends. A shaped bracket 42 may be secured, as by welding 43, to the cover 38 for support of the device, the tubular stem 10 extending through a hole 44 formed in the bracket and suitably secured thereto.

As mentioned above, the bimetallic wet and dry-bulb elements 11 and 12 are connected in series aiding, with the element 12 responding to the dry-bulb temperature and the element 11 responding to the wet-bulb temperature. Wet and dry-bulb elements having substantially the same deflection vs. temperature curves and substantially the same deflection rates are preferably employed. Knowing the deflection characteristics of the elements 11 and 12, calculations for the calibration of the scale 51 on the scale plate 32 may be made by assuming both of the elements are at the same temperature. Rearranging Equation 1 for the temperature humidity index produces:

$$\frac{THI - 15}{.4} = WB + DB \quad (2)$$

At a THI of 50, Equation 2 provides:

$$\frac{50 - 15}{.4} = WB + DB = 87.5° \text{ F.}$$

Assuming both of the elements 11 and 12 are at the same temperature, as mentioned above, a temperature of:

$$\frac{87.5° \text{ F.}}{2} = 43.75° \text{ F.} \quad (3)$$

will result in a deflection to a THI reading of 50. Then, knowing the deflection characteristics of the elements 11 and 12, as mentioned above, the location on the scale at which the indicator 31 will point when the temperature of both of the elements 11 and 12 is at 43.75° F. (for a THI of 50) may be readily calculated, or read off the deflecting curve of the elements. In similar manner, the deflection of the elements 11 and 12 may be calculated for any THI indication. Thus, for a further example, at a THI of 100, Equation 2 provides:

$$\frac{100 - 15}{.4} = WB + DB = 212.5° \text{ F.} \quad (4)$$

Again assuming both of the elements 11 and 12 are at the same temperature, a temperature of:

$$\frac{212.5° \text{ F.}}{2} = 106.25° \text{ F.} \quad (5)$$

will provide a deflection to give a THI reading of 100. The deflection vs. temperature chart of the elements quickly yields the deflection at a temperature of 106.25° F. Calculations for as many points on the THI scale as desired may be thereby made, and the scale plates marked accordingly. For a linear deflection vs. temperature curve of the elements, a THI scale which is very nearly linear results; the divisions at the lower end of the scale being slightly closer than at the upper end thereof, but with the non-linearity being hardly noticeable on the scale.

Having now described our invention in detail, in accordance with the requirements of the patent statutes, various changes and modifications will suggest themselves to those skilled in this art. For accuracy in indication, it will be apparent that the one element must respond to the dry-bulb temperature and the other to the wet-bulb temperature. Hence, any suitable means to ensure such response, by thermal isolation of such elements, is desirable. Thus, for example, a long connector 21 between elements may be used for physically separating the temperature responsive elements.

A fragmentary view of a THI indicator embodying this invention and including several modifications is shown in FIGURE 3 to which figure reference is now made. The wet and dry-bulb elements 11 and 12 are located within sections 10a and 10b, respectively, of a two piece stem 10', which sections are interconnected by a heat barrier bushing 52 made of stainless steel, nylon, or the like; a nylon bushing being preferred since the thermal conductivity thereof is less than stainless steel. The wet-bulb helix 11 has one end secured to the fixed plug 13' and the other end to a shaft 53, said shaft passing through a clearance hole 54 formed in the heat barrier bushing 52. The upper end of the shaft 53 is connected to one end of the dry-bulb helix 12 and the other end of the helix is connected through a staff 24' to an indicator, not shown in FIGURE 3. Obviously, the wet- and dry-bulb helices are connected in an aiding relation.

The heat barrier bushing 52 provides thermal isolation between the tube sections 10a and 10b, and separates the areas within which the helices operate. The tube 10b housing the dry-bulb element 12 may be provided with heat exchange fins 56 to promote the rapid temperature response of the section 10b to ambient temperature changes. Further, means forming holes 58 in the section 10b may be provided whereby surrounding air may pass through such holes and over the element 12 to insure the element of assuming ambient temperature. Finally, if a damping fluid 57 is found to be necessary to damp indicator vibration due to shock and vibration of the instrument, the fluid should not extend over both elements 11 and 12 since such fluid would provide a heat transfer path between elements. One means of avoiding such deleterious effect is to limit the level of the viscous damping liquid to cover, or partially cover, only one of the wet or dry-bulb elements. In FIGURE 3, the fluid 57 is shown covering about one half of the helix 11. It is intended that these and other such changes and modifications shall fall within the spirit and scope of the invention as recited in the following claims.

We claim:

1. A temperature humidity index indicator comprising a tubular stem, a pair of helical coils of bi-metallic material in the stem, means securing one end of one of the coils to the stem, a pointer, means securing one end of the other coil to the pointer, movable connector means located within the stem and secured to the free ends of the coils and providing a mechanical connection therebetween, and a wick extending over the stem over only one of the coils.

2. A temperature humidity index indicator comprising a cup-like casing, a transparent cover closing the casing, a tubular stem extending from the rear of the casing, said stem having a plug closing one end and the other end communicating with the interior of the casing, an elongated connector within the stem intermediate the ends thereof, said connector including an axial hole therethrough, a first helical coil of bimetallic material in said stem on one side of the connector, one end of the coil being secured to one end of the connector, means connecting the other end of the first helical coil to the stem, a second helical coil of bimetallic material in said stem on the other side of the connector, said second helical coil having one end secured to the connector, a staff secured to the other end of the said second coil and extending through the axial hole in the connector and through the coils into the casing, a scale plate with temperature humidity index values thereon within the casing, a pointer secured to the other end of the staff and cooperating with the scale plate, and an absorbent wick extending over the stem at one end thereof containing the said second coil.

3. A temperature humidity index indicator comprising: a housing member; a pair of flexible bimetallic elements; means securing one extremity of one of the bimetallic elements to the housing member; a pointer; means securing one extremity of the other bimetallic element to the pointer; movable connector means secured to an opposite extremity of each of the bimetallic elements and providing a mechanical connection therebetween; and an absorbent material located in close proximity to one of the bimetallic elements.

4. A temperature humidity index indicator comprising: a housing member; a pair of bimetallic coils in the housing member; means securing one end of one of the coils to the housing member; a pointer; means securing one end of the other coil to the pointer; movable connector means in the housing member secured to the free end of each of the coils and providing a mechanical connection therebetween; and an absorbent material located on the housing member in close proximity to one of the coils.

5. A temperature humidity index indicator comprising: a tubular stem having two sections; means comprising a heat barrier bushing interconnecting the two sections; a pair of helical coils of bimetallic material in the stem, with one coil within each section of the stem; means connecting one end of one of the coils to the stem; a pointer; means connecting one end of the other coil to the pointer; means extending through the bushing and connecting the other ends of the coils together; and a wick extending over one of the stem sections.

6. The invention as recited in claim 5 including heat exchange fins on the stem section not associated with the wick.

7. The invention as recited in claim 5 including means forming holes through the wall of the stem section not associated with the wick.

References Cited in the file of this patent

UNITED STATES PATENTS

| | | |
|---|---|---|
| 2,010,040 | Shurtleff | Aug. 6, 1935 |
| 2,034,884 | Sharp | Mar. 24, 1936 |
| 2,554,440 | Coburn | May 22, 1951 |
| 2,713,265 | Lamb et al. | July 19, 1955 |

OTHER REFERENCES

"Facts Behind the Weather Index," by Earl C. Thom (U.S. Weather Bureau).